United States Patent [19]

Ramde

[11] Patent Number: 5,711,239
[45] Date of Patent: Jan. 27, 1998

[54] PROPELLER CONFIGURATION FOR SINUSOIDAL WATERLINE SHIPS

[75] Inventor: Roar Rolland Ramde, Horten, Norway

[73] Assignee: Petroleum Geo-Services AS, Norway

[21] Appl. No.: 579,332

[22] Filed: Dec. 27, 1995

Related U.S. Application Data

[63] Continuation-in-part of Ser. No. 230,640, Apr. 21, 1994, Pat. No. 5,598,802.

[51] Int. Cl.$^6$ .................. B63B 1/06; B63B 1/08
[52] U.S. Cl. .................. 114/56; 114/57; 440/67
[58] Field of Search .................. 114/57, 56; 440/67, 440/53, 58, 60

[56] References Cited

U.S. PATENT DOCUMENTS

| 538,353 | 4/1895 | Schermerhorn | 114/56 |
| 3,013,519 | 12/1961 | Wiggermann | 440/58 |

FOREIGN PATENT DOCUMENTS

| 134767 | 3/1985 | European Pat. Off. | 114/56 |
| 243146 | 10/1987 | European Pat. Off. | 114/57 |

*Primary Examiner*—Sherman Basinger
*Attorney, Agent, or Firm*—Gordon T. Arnold; R. William Beard

[57] ABSTRACT

A ship of a displacement type with a pointed bow and a transom stern, a longitudinal length of L, and defining a base plane and a design waterline plane, the ship comprising: approximately sinusoidal waterlines; a surface extending from the transom stern at the design waterline plane to the base plane at about L/2 and defining an angle between: the base plane and an oblique plane, the oblique plane being defined by: a line at the intersection of the transom stern and the design waterline plane and a point located on the surface at about 0.2 L from the transom stern, and a first propeller which is attached to the ship so that the hull wake through the first propeller is less than 0.50. A ship of a displacement type with a transom stern, a longitudinal length of L, and defining a base plane and a design waterline plane, the ship comprising: approximately sinusoidal waterlines; and a surface extending from the transom stern at the design waterline plane to the base plane at about L/2 and defining an angle between: the base plane and an oblique plane, the oblique plane being defined by: a line at the intersection of the transom stern and the design waterline plane and a point located on the surface at about 0.2 L from the transom stern; a first propeller which is attached to the surface of the ship near a first corner of the transom stern; and a second propeller which is attached to the surface of the ship near a second corner of the transom stern. A ship of a displacement type with a pointed bow and a transom stern, a longitudinal length of L, and defining a base plane and a design waterline plane, the ship comprising: approximately sinusoidal waterlines; and a surface extending from the transom stern at the design waterline plane to the base plane at about L/2 and deeming an angle between: the base plane and an oblique plane, the oblique plane being defined by: a line at the intersection of the transom stern and the design waterline plane and a point located on the surface at about 0.2 L from the transom stern, and a first propeller wherein an axis of the first propeller is substantially parallel to the base plane of the ship.

16 Claims, 10 Drawing Sheets

RAD = 80 MM MODEL SCALE

FIG. 12C

RAD = 100 MM MODEL SCALE

$b/B \sim 1/10$

PROPELLER CONFIGURATION FOR SINUSOIDAL WATERLINE SHIPS

FIELD OF THE INVENTION

The application is a Continuation-in-Part of U.S. patent application Ser. No. 08/230,640 filed on Apr. 21, 1994, now U.S. Pat. No. 5,598,802. This invention relates to propulsion systems for ship hull designs made of the sinusoidal waterline variety.

BACKGROUND OF THE INVENTION

Recently, sinusoidal water-line hulls have been developed to improve a vessel's dead-weight tonnage transverse stability, navigational and sailing properties and to reduce stresses on the hull beam whether the vessel is sailing in quiet water or into the waves. An example of this type of hull is described in European Patent 0 134 767 B 1, issued to Ramde, incorporated herein by reference.

As explained in the Ramde patent, at given main dimensions of length, beam and draught, conventional hull configurations can obtain greater deadweight tonnage by increasing the fullness of the underwater portion of the hull, thereby increasing the total displacement. To improve the transverse stability of a conventionally formed hull, expressed as a higher initial metacenter, the beam of the hull can be increased to obtain a greater moment on inertia at the waterline, optionally also raising the volumetric center of gravity of the underwater hull.

This configuration has a large flat oblique surface that extends from the stern at the waterline down to the keel line at the midship. This surface encompasses the whole aft section of the ship and is angled downward from the stern toward the bow. The first Ramform ship built under the original patent is designed with an angle of 14.2 degrees between the oblique plane and the base plane. Originally, it was believed that the water flowlines in the aft section would run parallel to this surface rather than parallel to the waterline. However, now it is observed that the flowlines separate from the oblique plane so that the wake of this ship contains vortices which shed from the wide, sloping aftship. This effect is caused by the steep angle of 14.2 degrees between the two planes, so that the flow in the boundary layer separates and reverses direction near the oblique plane of the bottom, resulting in the generation of vortices.

The propulsion system disclosed in the Ramde European '767 patent was designed to accommodate angled flow lines which remained attached to the oblique plane. The axis of the propeller (f) is shown substantially parallel to the approximately oblique surface (s). This angled orientation was believed to increase the overall thrust of the propeller because the propeller race was in line with the water flow lines. This was to allow unstable flow from the propeller to remain attached to oblique surface. If the unstable flow separates from the oblique surface, drag or resistance is significantly increased. This design was to produce greater overall thrust in spite of the smaller horizontal thrust component cause by the inclined installation of the propeller.

However, it is now observed that for particular angles of the oblique plane, unstable flow can remain attached to the oblique surface. Also, the hull wake varies at different points over the oblique surface. Therefore, there is a need for a sinusoidal water-line hull that has a propeller that is positioned in a region of reduced hull wake and that produces a larger horizontal thrust component without causing separation of the flow lines from the oblique surface.

SUMMARY OF THE INVENTION

The present invention places propellers near the corners of the stern rather than in the center of the oblique surface. Tests have reveled that regions near the stern corners have reduced hull wake and that the water flowlines are parallel with the base plane rather than the oblique surface. Therefore, propellers attached to the ship at the stern corners may be parallel with the base plane of the ship to impart the entire thrust component in the direction of the ship's forward motion. Also, the angle of the oblique surface is modified to ensure that the flow lines do not separate from the oblique surface near the center of the ship in the absence of propellers which had been positioned there.

According to one embodiment of the invention, there is provided a ship of a displacement type with a pointed bow and a transom stern, a longitudinal length of L, and defining a base plane and a design waterline plane, the ship comprising: approximately sinusoidal waterlines; a surface extending from the transom stern at the design waterline plane to the base plane at about L/2 and defining an angle between: the base plane and an oblique plane, the oblique plane being defined by: a line at the intersection of the transom stern and the design waterline plane and a point located on the surface at about 0.2 L from the transom stern, and a first propeller which is attached to the ship so that the hull wake through the first propeller is less than 0.50.

According to another embodiment of the invention, there is provided a ship of a displacement type with a transom stern, a longitudinal length of L, and defining a base plane and a design waterline plane, the ship comprising: approximately sinusoidal waterlines; and a surface extending from the transom stern at the design waterline plane to the base plane at about L/2 and defining an angle between: the base plane and an oblique plane, the oblique plane being defined by: a line at the intersection of the transom stern and the design waterline plane and a point located on the surface at about 0.2 L from the transom stern; a first propeller which is attached to the surface of the ship near a first corner of the transom stern; and a second propeller which is attached to the surface of the ship near a second corner of the transom stern.

According to a further embodiment of the invention, there is provided a ship of a displacement type with a pointed bow and a transom stern, a longitudinal length of L, and defining a base plane and a design waterline plane, the ship comprising: approximately sinusoidal waterlines; and a surface extending from the transom stern at the design waterline plane to the base plane at about L/2 and defining an angle between: the base plane and an oblique plane, the oblique plane being defined by: a line at the intersection of the transom stern and the design waterline plane and a point located on the surface at about 0.2 L from the transom stern, and a first propeller wherein an axis of the first propeller is substantially parallel to the base plane of the ship.

The preceding embodiments are given by way of example, only. No limitation of the invention is intended by the inclusion of any particular feature or combination in the preceding examples, as it will be clear to a person of ordinary skill that the invention lends itself to other embodiments.

BRIEF DESCRIPTION OF THE DRAWING

The present invention will be better understood by reading the following description of nonlimitative embodiments, with reference to the attached drawings which are briefly described as follows.

It is to be noted, however, that the appended drawings illustrate only typical embodiments of the invention and are therefore not to be considered a limitation of the scope of the invention which includes other equally effective embodiments.

DETAILED DESCRIPTION OF THE INVENTION

Figure 1:
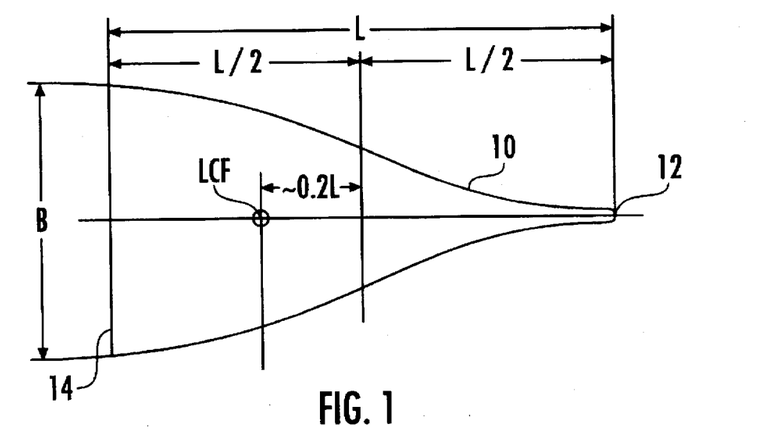
FIG. 1 is a top plan view of a hull made according to an embodiment of the present invention.

Referring now to FIG. 1, according to one embodiment of the present invention, there is provided a hull 10 with more rounded lines than conventional hull configurations, expressed by the term for slenderness of line $L/V^{1/3}$, where L is the length of the hull at the design waterline (dwl) corresponding to the depth T to the summer freeboard (see FIG. 2), and V is the displacement volume of the hull at the design waterline. Further according to this embodiment, $L/V^{1/3}$ is about 3 or greater, but the specific resistance to propulsion compared to conventional hull configurations is not increased. At the same time, the present embodiment provides that the hull beam B is such that the L/B ratio is between about 1 and about 2.2. The preferred ratio has been found to be about 1.7. B is the maximum beam of the hull at the design waterline (dwl). According to this embodiment, the height of the metacenter of the hull 10 is more than doubled in relation to conventional hull configurations of the same length.

According to a further embodiment of the invention, the displacement distribution in the longitudinal direction approximates a Rayleigh wave. Such a wave is accomplished in the present embodiment with substantially squarely cut off, approximately harmonic sinusoidal waterlines (FIG. 2: dwl, 1, 2, 3) with extremity or stationary points 12 and 14 at the ends of the hull fore and aft, while at the same time the base lines of the waterlines ($O_{dwl}$, $0_1$, $0_2$, $0_3$) from the design waterline (dwl) and at increasing depths from this gradually are displaced in the direction of forward propulsion, shortened so far that an approximately oblique surface (s), which may be straight, is defined. Further in accordance with this embodiment, surface (s) which comprises the stern half of the hull 10 and permits utilization of various propulsion systems.

Figure 2:
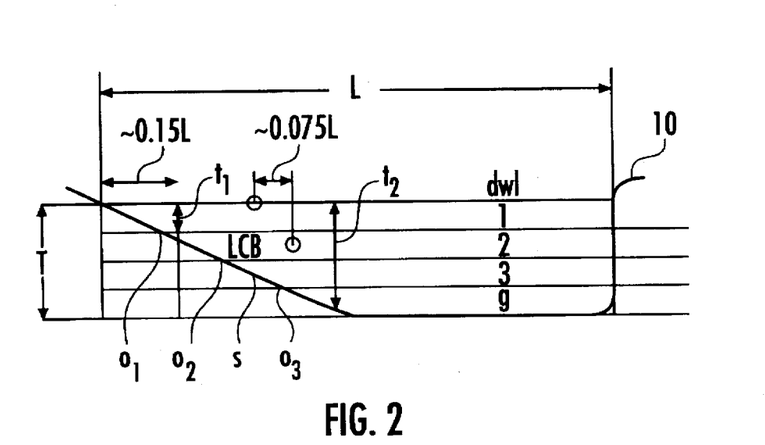
FIG. 2 is a side elevation of the hull of FIG. 1.
Figure 3:
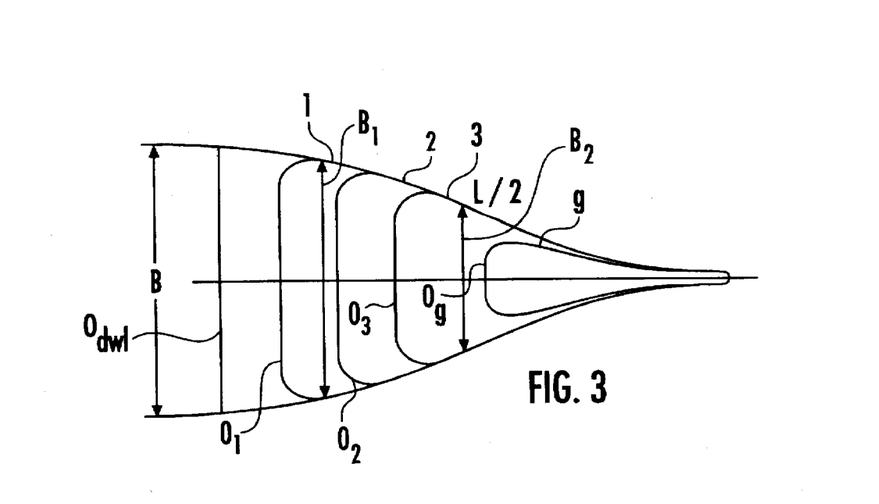
FIG. 3 is bottom plan view of the hull of FIG. 1.

Referring now to FIGS. 2 and 3, according to a further embodiment of present invention, a ratio B1/t1 is defined at a transverse section through the hull 10 below the design waterline (dwl) at a distance of about 0.15 L from the stern, wherein (B1) is the beam at the design waterline (dwl) and (t1) is the draught of the hull (measured from the same waterline). According to this embodiment, the ratio B1/t1 is about 15. According to an alternative embodiment, the ratio B1/t1 is greater than the corresponding ratio for a section at L/2 where the beam ($B_2$) and draught ($t_2$) are measured in the same way.

According to a further embodiment of the invention a further hull ratio $e=C_p/C_{dwl}$ is defined, wherein $C_p$ is the hull's block coefficient and $C_{dwl}$ is the hull's longitudinal prismatic coefficient expressed from the following equations:

$$C_p = V/(A_{L/2} \times L) \text{ and } C_{dwl} = A_{dwl}/LB,$$

wherein L is the length at the design waterline, A is the area of a transverse section up to the waterline at L/2, V is the displacement volume to the design waterline, $A_{dwl}$ is the waterline area, and B is the maximum beam at the waterline. According to this embodiment, the hull parameter e is about 1 or greater.

Referring again to FIG. 1 according to a further embodiment of the invention, the design waterline's areal center of gravity (LCF) is located around 0.2 L aft of midship, and the improved hull's volumetric center of gravity (buoyancy) (LCB) at the depth of about 0.3T below the design waterline (dwl) around 0.075 L forward of areal center of gravity, which may be expressed as LCF−LCB=0.075 L.

Referring again to FIG. 1, the hull 10 is shown with the approximately harmonic sinusoidal waterlines around the design waterline (dwl) with extremity points around the hull's bow and stern ends with, wherein the areal center of gravity (LCF) is about 0.2 L aft of L/2.

FIG. 2 shows the an embodiment of the invention's hull below the design waterline (dwl) in vertical section, where it is seen that the base lines are substantially squarely cut off. Further in accordance with this embodiment, there are approximately harmonic sinusoidal waterlines ($0_{dwl}$, $0_1$, $0_2$, $0_3$) along a sloped generally planar surface (s), which are displaced in the direction of forward propulsion of the vessel, and which coincide with the base plane (g) at about L/2. Further, the distance between the areal center of gravity (LCF) and the buoyancy center of gravity (LCB) of the hull 10 at the depth of the design waterline (dwl) is about 0.075 L. The generally planar surface (s) in some embodiments takes the form of a curved surface with a very large radius, (for example between about 3 and about 5 times the maximum beam, and in a specific embodiment, about 4)

In FIG. 3, the hull configuration of FIG. 2 is shown in horizontal projection with the waterlines dwl, 1, 2, 3 and, g in the examples with a U-frame at the bow end of the hull. According to alternative embodiments of the invention, other known frame forms are used. The embodiment of FIG. 3 also has a ratio between beam and depth for a section around 0.15 L from the stern and at L/2, where the respective beams and depths are designated $B_1$ and $B_2$ and $t_1$ and $t_2$.

Referring again to FIG. 1, the length (L) and beam (B) dimensions are shown. It has been determined that small L/B values produce unexpected high viscous damping in roll, pitch and heave, indicated by higher natural periods. Tests were performed to determine the magnitude of this damping. Two models were tested, B30 and B40, with L/B ratios 1.78 and 2.38 respectively. These models had the following characteristics:

B30

| | | |
|---|---|---|
| Length Overall | $L_{oa}$ | 78.50 m |
| Breadth | $B_{max}$ | 30.00 m |
| Displacement | $\nabla$ | 6070 m$^3$ |
| Draught | T | 7.06 m |
| Wetted Surface | S | 2010 m$^2$ |
| Long. Center of Gravity From Stern | LCG | 32.00 m |
| Vert. Center of Gravity Above Base | VCG | 9.61 m |
| Metacenter Radius | $KM_T$ | 14.14 m |
| Metacentric Height | $GM_T$ | 4.02 m |
| Transverse Radius of Gyration (Air) | $k_{xx}$ | 8.51 m |
| Longitudinal Radius of Gyration (Air) | $k_{yy}$ | 20.45 m |
| ADDED MASS/MOMENTS | | |
| Calculated Roll Period in Air | T $\phi'$ | 8.51 sec. |
| Measured Roll Period in Water | T $\phi$ | 10.0 sec. |
| Transverse Radius of Gyration in Water | $k_{xx}$ | 1.176 · $K_{xxair}$ |
| Total Moment of Inertia | $I_{xx}$TOT | 1.38 · $I_{xxair}$ |
| Calculated Pitch Period in Air | T$\Theta$ | 5.99 sec. |
| Measured Pitch Period in Water | T$\Theta$ | 9.1 sec. |
| Longitudinal Radius of Gyration in Water | $k_{yy}$ | 1.51 · $k_{yyair}$ |
| Total Moment of Inertia | $I_{yy}$TOT | 2.30 · $I_{yyair}$ |

B40

| | | |
|---|---|---|
| Length Overall | $L_{oa}$ | 78.50 m |
| Breadth | $B_{max}$ | 40.00 m |
| Displacement | $\nabla$ | 6590 m$^3$ |
| Draught | T | 6.16 m |
| Wetted Surface | S | 2445 m$^2$ |
| Long. Center of Gravity from Stern | LCG | 34.00 m |
| Vert. Center of Gravity above Base | VCG | 7.03 m |
| Metacenter Radius | $KM_T$ | 22.87 m |
| Metacentric Height | $GM_T$ | 15.84 m |
| Transverse Radius of Gyration (Air) | $k_{xx}$ | 9.30 m |
| Longitudinal Radius of Gyration (Air) | $k_{yy}$ | 21.25 m |
| ADDED MASS/MOMENTS | | |
| Calculated Roll Period in Air | T $\phi'$ | 4.7 sec. |
| Measured Roll Period in Water | T $\phi$ | 7.2 sec. |
| Transverse Radius of Gyration in Water | $k_{xx}$ | 1.537 · $K_{xxair}$ |
| Total Moment of Inertia | $I_{xx}$TOT | 2.36 · $I_{xxair}$ |
| Calculated Pitch Period in Air | T$\Theta$ | 5.43 sec. |
| Measured Pitch Period in Water | T$\Theta$ | 9.0 sec. |
| Longitudinal Radius of Gyration in Water | $k_{yy}$ | 1.66 $k_{yyair}$ |
| Total Moment of Inertia | $I_{yy}$TOT | 2.75 · $I_{yyair}$ |

Before the testing in waves, pendulum tests in air were carried out with the models, to adjust the mass distribution according to the specified values. Inclining tests in water were carried out to control the metacentric height. Also motion decay tests in water were carried out for the three load conditions to obtain information on the natural periods, added mass and moments and the viscous damping.

The tests in waves were carried out as follows:

| | |
|---|---|
| Heading | 90 deg (beam seas) |
| Vessel speed | 0 knot |
| Number of reg. waves | 10 |
| Number of wave spectra | 3 |
| Number of load conditions, B = 40 m | 2 (transport and operation) |
| Number of load conditions, B = 30 m | 1 (operation) |

As shown in the table below, the increase in viscous dampening in roll, pitch and heave due to added displacement of oscillating water farther from the center of rotation is considerable compared to conventional vessels.

| | VISCUS DAMPENING | | |
|---|---|---|---|
| | ROLL | PITCH | HEAVE |
| Ramform B30 | 0.38 × $I_{xx}$ | 1.3 × $I_{yy}$ | |
| Ramform B40 | 1.36 × $I_{xx}$ | 1.75 × $I_{yy}$ | 2.5 × $\Delta$ |
| Conventional | 0.2–0.4 × $I_{xx}$ | | 0.5–1.0 × $\Delta$ |

Also, long trend probability analyses for roll in Northern North Atlantic showed that the roll amplitude over return periods up to 100 years are about 50% lower for the wider ship with the lowest L/B ratio of 1.78. An optimum L/B ratio is about 1.7. The main reason for this difference is the large ratio between the bottom plane area and the immersed volume. The practical consequences are that the angular roll motion and heave motion (vertical displacement) for the ship with the lowest L/B ratio will be lower than for the ship with a higher L/B ratio. This is, in particular, unexpected for roll motion.

Increasing the beam relative to the length, however, tends to increase the resistivity of the ship, which normally yields a lower Froude Number. The Froude Number is defined as $V/(gL)^{1/2}$ where V is the speed of the ship, g is the gravitational acceleration constant, and L is the length of the ship. The Froude Number, rather than the ship's absolute speed, defines whether a ship is fast or slow. Thus, two ships may have the same absolute speed and one of them could be a fast ship and the other a slow one, since the former may be short and the latter much longer. It is desirable to have a ship with a Froude Number between about 0.1 and about 0.35. Thus, even though the ship outlined above has a relatively low L/B ratio, which tends to increase the resistance, it should be between about 0.1 and about 0.35.

Figure 4:
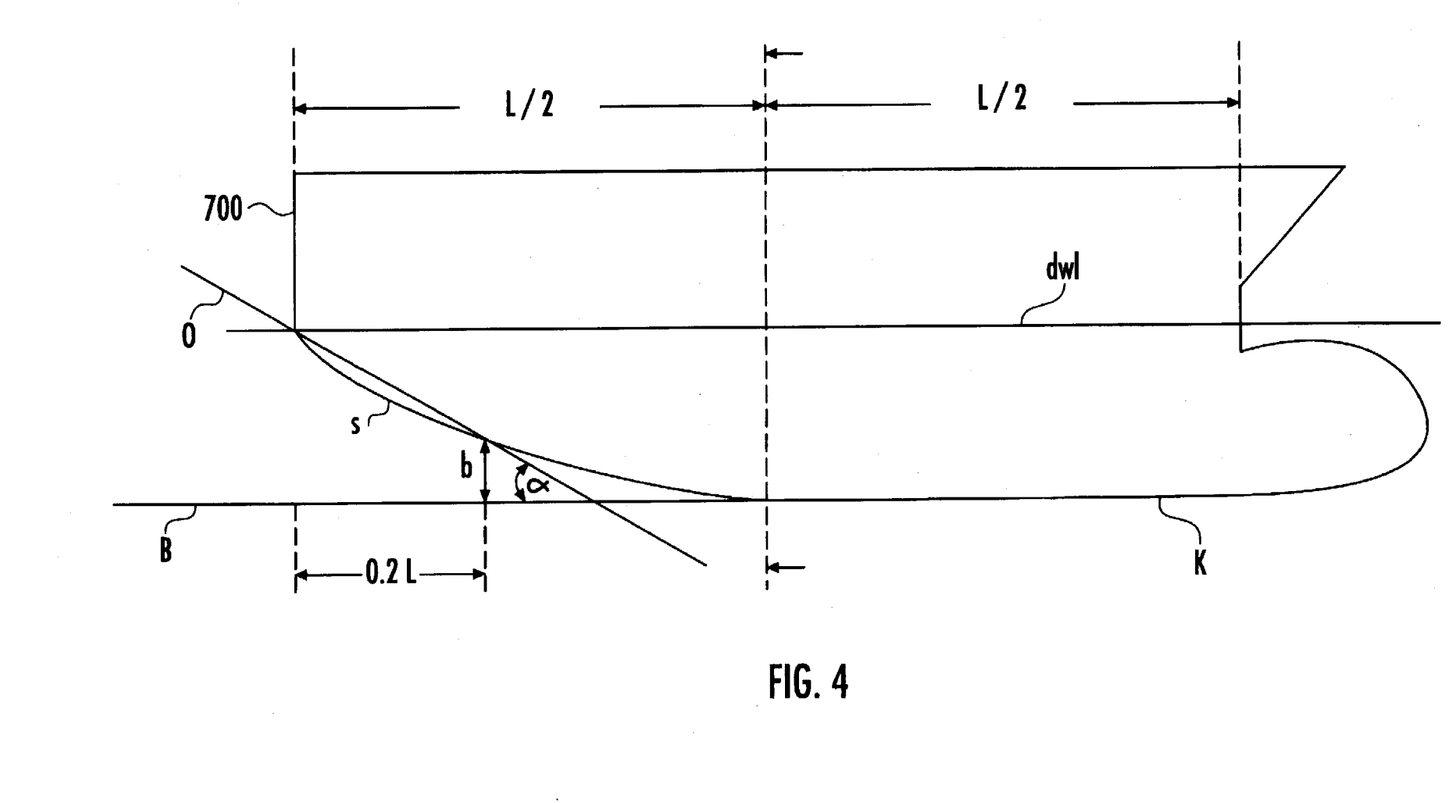
FIG. 4 is a side view of a hull made according to an embodiment of the present invention.

Referring to FIG. 4, a base plane (B) and an oblique plane (O) are shown. The base plane (B) is parallel to the design water line (dwl) and coincides with the keri line (K) of the ship. A surface (S) extends from the transom stern (700) at the design waterline plane (dwl) to the base plane (B) at about L/2. The oblique plane (O) intersects the transom stern (700) at the design waterline plane (dwl) and a point located on the surface (S) at about 0.2 L from the transom stern (700). The angle between the oblique plane (0) and the base plane (B) is defined as alpha ($\alpha$).

The angle ($\alpha$) dictates whether the water flowlines over the surface (S) remain attached to the surface (S) or whether the flowlines become separated. At smaller angles the flowlines do not separate from the surface (S) of the ship. If the flowlines do separate from the surface (S), then vortices are formed at the region of separation which increases the ships resistance. Tests were performed to determine the angle which provides the lowest resistance.

A ship was tested in a model basin with respect to the effect of the variation in angle between the oblique plane and the base plane on model resistance. A resistance test was run with constant draught at F.P. and the dynamic suction in F.P. was measured at speeds 13–17 knots. The hull model M-1867 C was manufactured to the scale ratio 1:26.5. The model was equipped with a trip wire at station 9½ in order to obtain turbulent flow. Stabilizing fins and thruster pods were not fitted to the model. All results refer to salt water with density 1025 kp/m³ and a sea temperature of 15° C.

The resistance tests were carried out as follows:

| Draught | Trim | Appendage | Speed |
| --- | --- | --- | --- |
| (m) | | | (knots) |
| 4.95 | 0 | — | 13–18 |
| 4.95 | 1 deg f.wd | — | 13–17 |
| 4.95 | 1 deg aft | — | 13–17 |
| 4.95 | 0 | Fixed F.P. | 13–17 |
| 4.95 | 0 | Bow foil | 13–17 |

Test Results

Effective horse power for M-1867 C at draught T=4.95 m, even keel=100%.

| $V_s$ (knots) | Even Keel | 1° f.wd. | 1° aft | Fixed F.P. |
| --- | --- | --- | --- | --- |
| 13 | 100 | 99.1 | 105.8 | 105.2 |
| 14 | 100 | 114.8 | 108.3 | 107.4 |
| 15 | 100 | 106.6 | 93.8 | 91.4 |
| 16 | 100 | 103.2 | 88.7 | 84.1 |
| 17 | 100 | 108.6 | 93.9 | 86.4 |

The dynamic suction measured at F.P. for test with fixed forward draught:

| $V_s$ (knots) | Suction (tonnes) |
| --- | --- |
| 13 | 104.6 |
| 15 | 141.4 |
| 17 | 188.3 |

From the test results, it was found that the resistance varies between 103.2 and 88.7% compared to the "even keel" angle, which was set to about 13.2 degrees or about 1 degree less than on model No. 1. The reduced resistance is due to the elimination of vortices because the flowlines remain attached to the oblique surface (S). Reducing this angle by about 1 degree, to about 12.2 degrees, the lowest resistance level in the design speed range was obtained.

Thus, is was determined that a sinusoidal waterline hull having a L/B ratio of about 1.7 could still have a Froude Number of about 0.32 by adjusting the angle between the oblique plane and the base plane to be about 12.2°.

Figure 5:
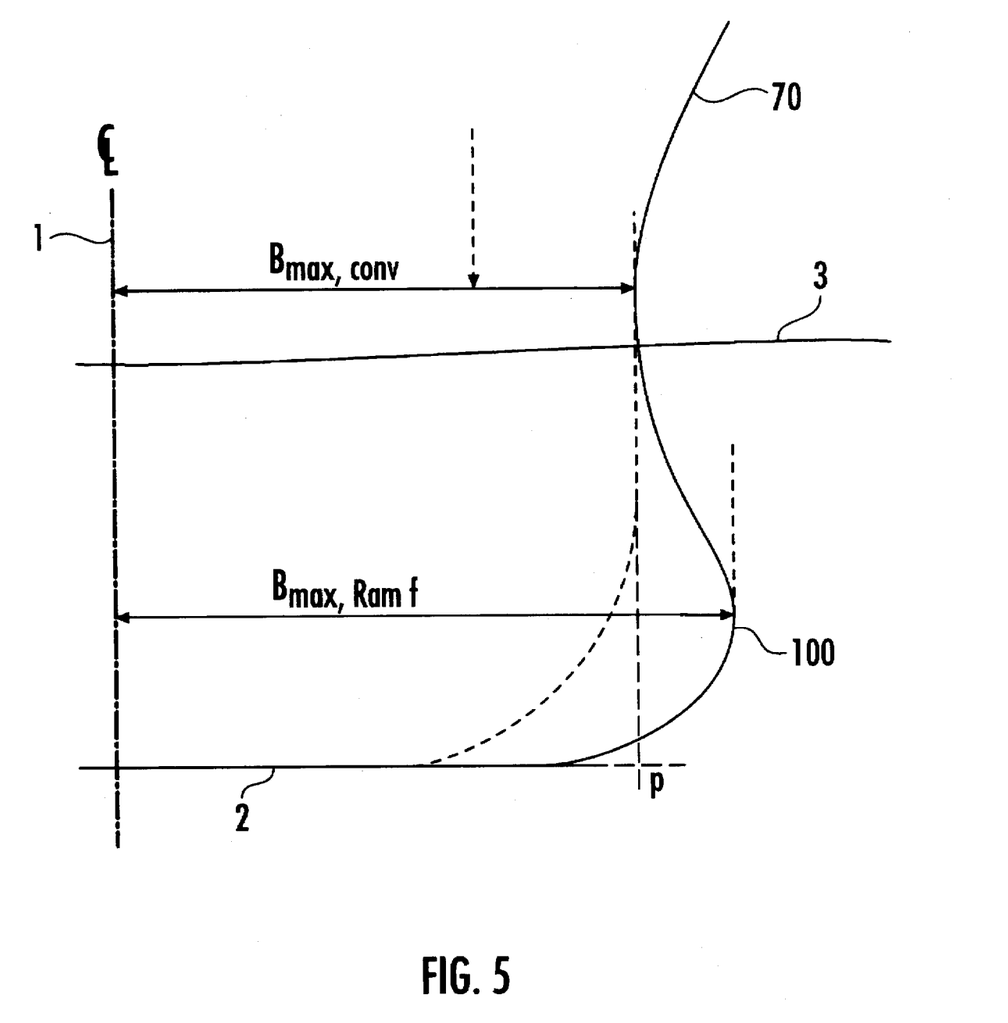
FIG. 5 is a schematic diagram of a transverse cross-section of a bulge at the edge of the oblique surface.

FIG. 5 represents a schematic diagram of a transversal cross section of a sinusoidal waterline-type hull ship according to the present invention showing the principal transition curves shipside-bottom cross sections for a conventional ship which is represented by a dotted line and a sinusoidal waterline-type hull ship represented by the full line with a horizontally extending bulge. As the hull of the ship is substantially symmetrical, only one half of the transversal cross section of the ship is represented so that the center line plane 1 which is used as reference line to determine the beam of the ship at various heights of the transversal cross section. The hull of a conventional ship comprises a side board plane which is substantially parallel to the center line plane 1 and which rims into the bottom plane by a curved portion connecting the side board plane with the bottom plane of the ship. This curved portion is defined by a radius related to a imaginary point P constructed by the intersection of an elongated line lying in the side board plane and an elongated line lying in the bottom plane 2. This point P also corresponds to the maximum beam of a conventional ship characterized by $B_{max,\,conv}$. The side board plane is parallel to the center line plane 1 in the area of the waterline 3 in the midship section of a conventional ship.

The general shape of one embodiment of a sinusoidal waterline-type hull 10 significantly deviates from the general shape of a conventional hull form. On the one hand the hull 10 is curved at a certain radius in a concave way related to the center line plane 1 and running into a bulge 100 near the bottom plane 2, said bulge 100 going beyond the line through the side board plane and point P, which defines the maximum beam of a conventional ship $B_{max,\,conv}$ so that the maximum beam of a sinusoidal waterline-type hull ship is larger, by the difference between $B_{max,\,conv}$ and $B_{max,\,sin}$ than $B_{max,\,conv}$. Such a bulge 100 which is arranged below the waterline 3 and which has smooth transition ranges from the side board of the ship into the bulge 100 and from the bulge into the bottom plane 2, increases the deadweight of the ship as well as the rolling, pitching and to a certain extent also heaving movements of the ship. However, the amount of improvement of the rolling behavior of a sinusoidal waterline-type hull ship without a bulge is rather limited because the water displaced by the hull form in the bottom plane range of the ship can easily flow transversely around the bulge 100 without giving a significant reduction of rolling behavior of the ship.

Figure 6:
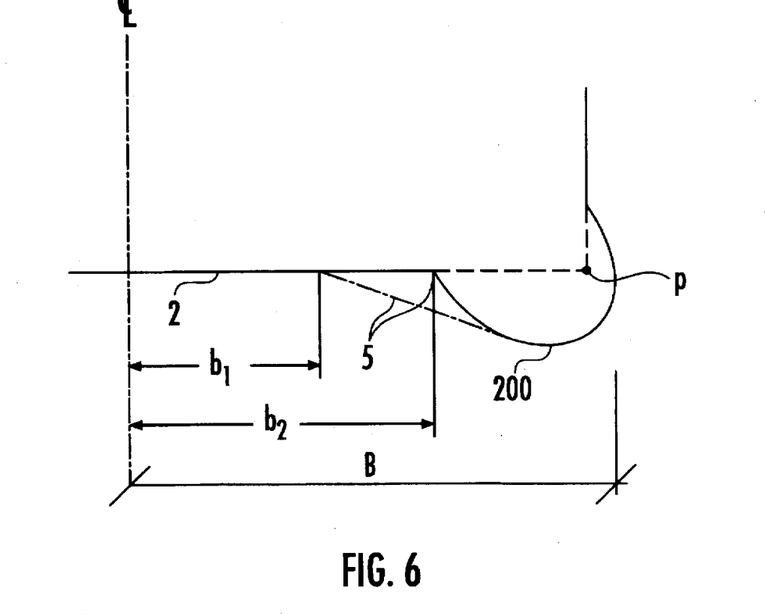
FIG. 6 is a schematic diagram of a cross section of a bulge which extends both in horizontal and vertical directions.

FIG. 6 comprises a schematic diagram of a cross section of an improved sinusoidal waterline-type hull ship according to FIG. 5. This sinusoidal waterline-type hull ship, however, comprises a horizontally and vertically extending bulge 200 according to the invention. The construction of point P corresponds to the one described with regard to FIG. 5. As it can be seen from FIG. 6, the bulge 200 encircles this point P both in horizontal and in vertical direction. Again, this point P represents the locus at which the local extension of the basically vertical ship side, the side board plane, and the basically horizontal bottom of the ship intersect. Furthermore, it can be seen from FIG. 6 that the bulge 200 goes below the bottom plane 2 of the ship and comprises transition portions 5, i.e. the transition curves between the portion of the bulge 200 approaching the bottom plane 2 of the ship.

It very much depends on the properties to be achieved by the sinusoidal waterline-type hull ship whether the transition curves 5 comprise a steeper or a flatter transition region. The bulge 200 extending also in vertical direction beyond the bottom plane 2 increases the deadweight of the ship significantly and on the other hand significantly improves mainly the rolling capability of the ship. This rolling improvement, among others, results from the fact that, when the ship is rolling in seawaves, the water flowing around the hull in the bottom plane region 2 transversely from the center line of the ship towards the bulge 200 is forced downwards and hence, generating a lift component to the ship which related to the center line plane of the ship corresponds to a moment directed upwards.

In order to ensure that, nowhere on the hull of the ship, the bulge 200 goes below the keel line which is important from the point of view of docking the ship without giving rise to damage to the hull during the docking operation, the bulge 200 starts from a zero vertical extension at the area of about L/3 from the bow and gradually increases towards the transom stern 7 of the ship.

Figure 7:
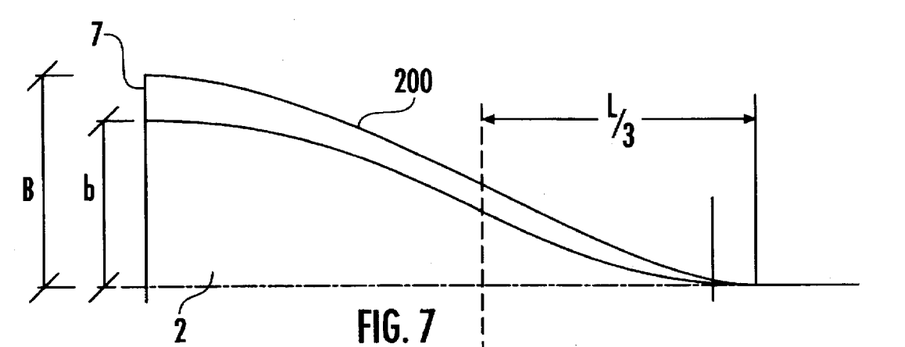
FIG. 7 represents a bottom plane view of half a hull according to FIG. 5 made with a bulge running from the bow of the ship to the transom stern.

FIG. 7 represents a bottom plane view of half a hull according to FIG. 5 made with a bulge 200 running from the bow of the ship up to the transom stern 7. This Figure indicates that the vertical extension of the bulge 200 can already start at the bow region of the ship and gradually increase therefrom to the transom stern. The line inside the bottom view represented in FIG. 7 represents the point at the respective cross section where the bulge 200 runs into the bottom plane 2. That means the line shown represents a tangent line of the locus, where the bulge 200 runs into the bottom plane, that means that in the range L/3 from forward perpendicular FP of the ship, the only horizontally extending bulge runs into the bottom plane 2 of the ship at a point inside the distance between the center line plane of the ship and point P.

According to a further embodiment of the invention, the vertical extension of the bulge 200 starts, for the reasons mentioned with regard to FIG. 6, approximately at a point L/3 of the ship and gradually increases towards the transom stern. The width of the bulge 290, where the bulge comprises also a vertical extension with regard to the bottom plane 2 is preferably in a range defined by the ratio b/B approximately 0.5 to 0.8. The term b stands for the distance from the center line plane 1 to the tangent line, where the vertical extending bulge 200 runs into the bottom plane 2, whereas B represents the maximum width of the ship at this particular cross section, that means the distance between the center line plane 1 of the ship and the maximum beam including the horizontal extension of the bulge 200 with regard to point P.

Figure 8:
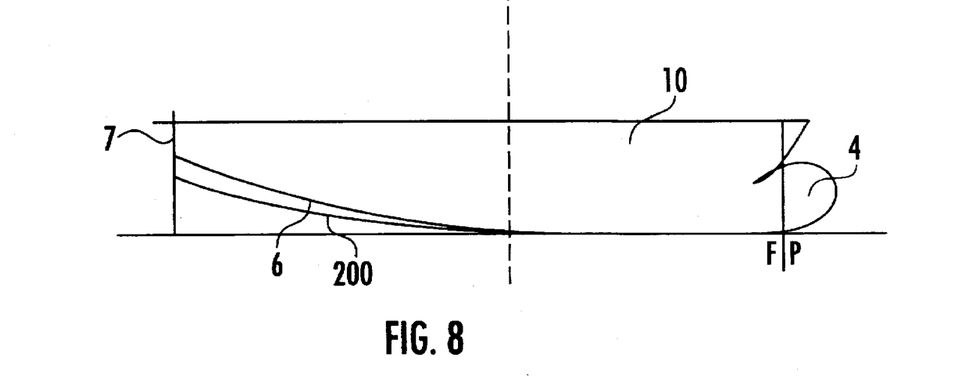
FIG. 8 represents a sideview of the hull made according to an embodiment of the present invention.

FIG. 8 represents a sideview of the hull made according to an embodiment of the present invention. The hull 10 of the sinusoidal waterline-type hull ship comprises a bulbous bow going in forward direction beyond forward perpendicular FP of the ship, a sloped surface 6 starting from about L/3 to the transom stern 7 of the ship. At a cross section forward perpendicular, the tangent line coincides with the center line of the bulbous bow 4. The bulge 200 is shown extending from and below surface 6.

Also, the improved hull configuration provides zones of reduced hull wake. Hull wake describes a phenomenon wherein water particles flowing around the hull have vector components in the same direction as the forward motion of the ship. Regarding propeller placement, it is important to know the speed of the water through the space occupied by the propeller relative to the ship. The wake fraction is given as Taylor-wake $W_T = 1 - V_a/V$, where $V_a$=Speed of water through the propeller disc, and V=Speed of the ship. Thus, where $W_T$ is nearly one (1), the water particles moving through the propeller disc have forward components nearly as great as the ship. This is undesirable. However, if $W_T$ is nearly zero (0), then the forward vector components of the water particles are almost non existent. Therefore, it is best to position the propellers where $W_T$ is nearly zero (0).

Figure 9:
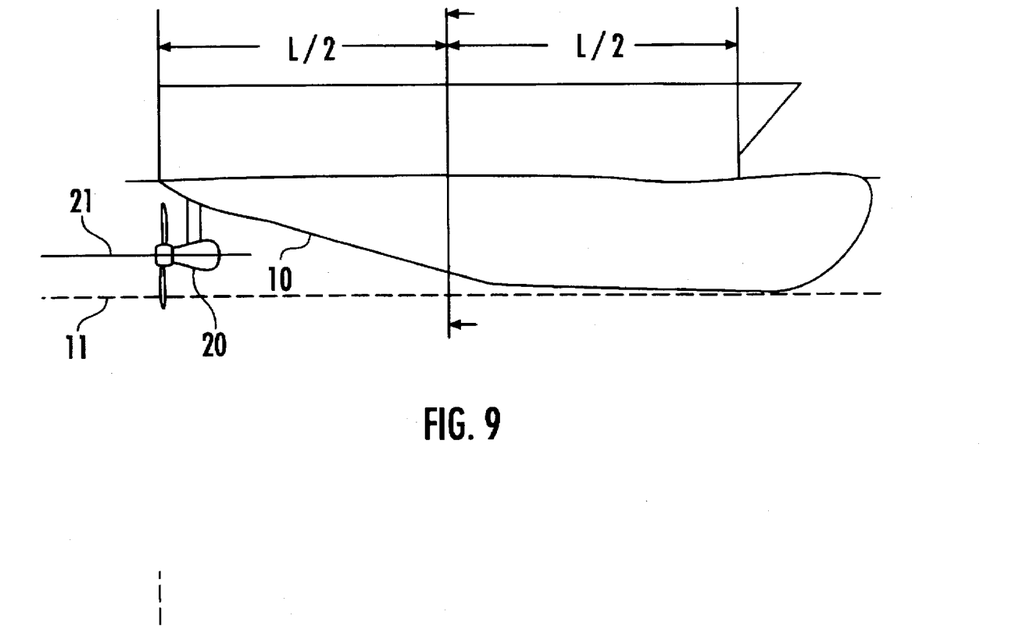
FIG. 9 describes one embodiment of the invention shown from the starboard side.
Figure 10:
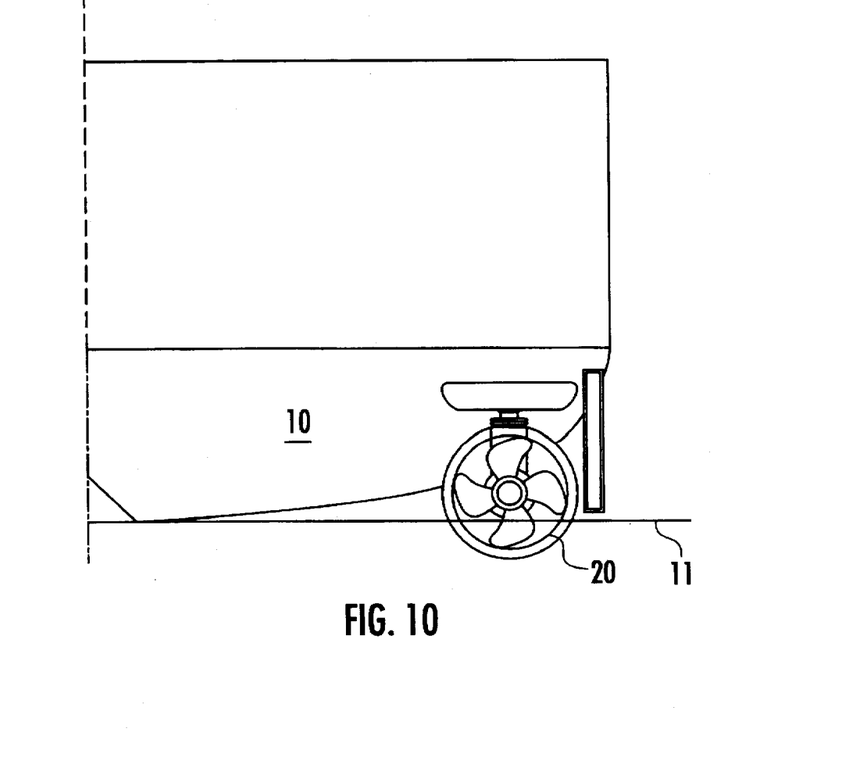
FIG. 10 shows an aft view of an embodiment of the invention.
Figure 11:
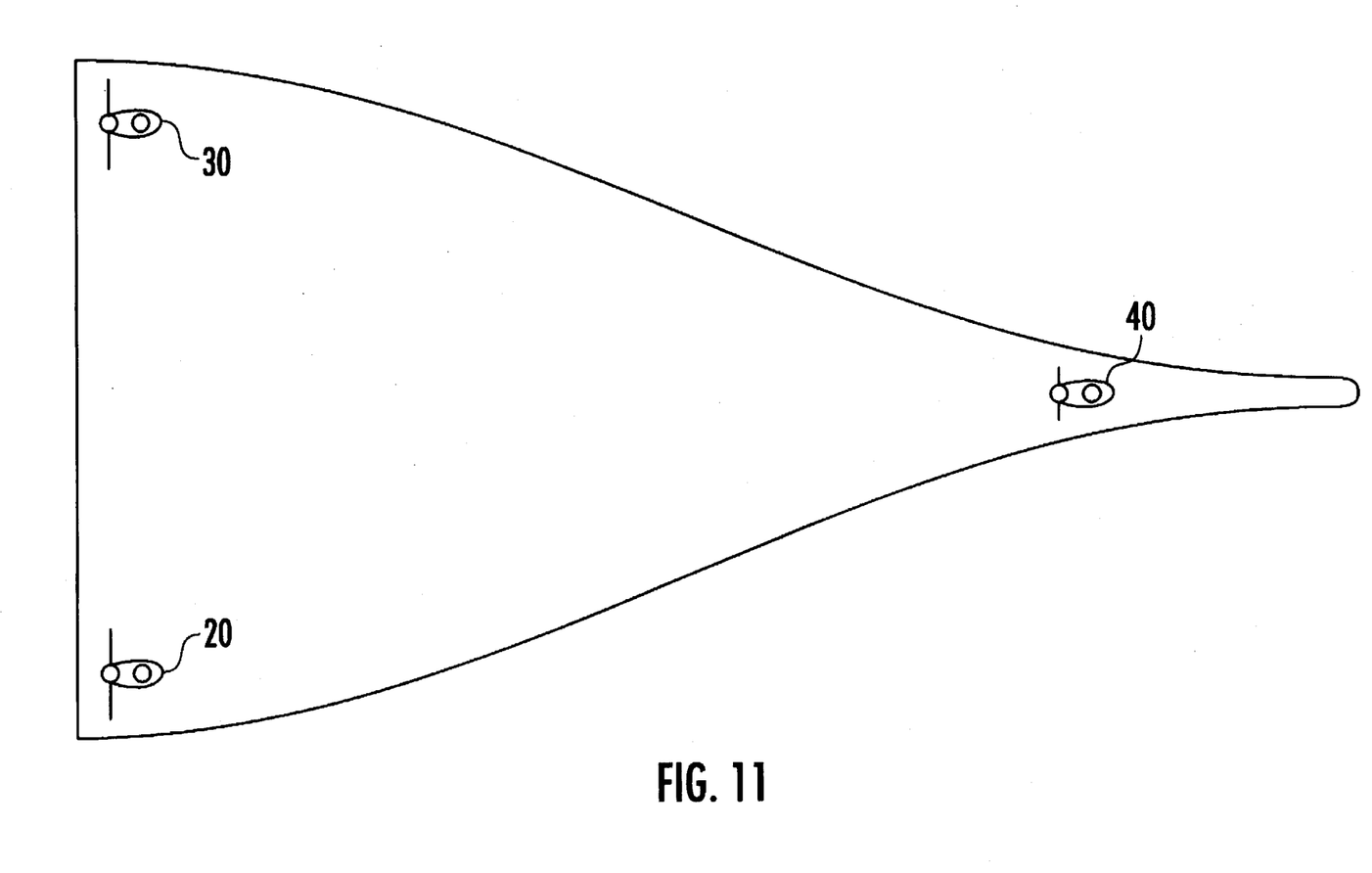
FIG. 11 depicts a top view of an embodiment of the invention.
Figure 12A:
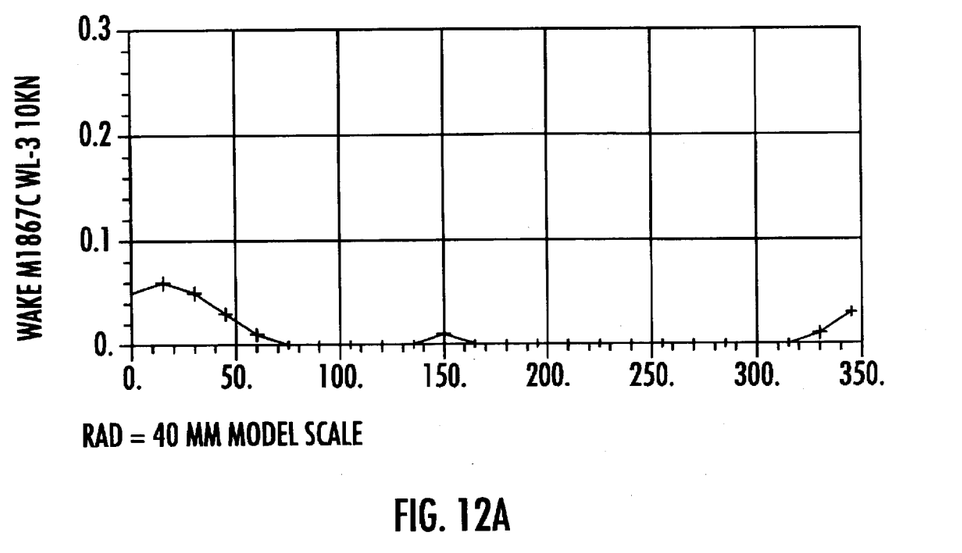
FIG. 12a shows test results for the Taylor Wake for angular positions at a radius of 40 mm relative to the scaled model.
Figure 12B:
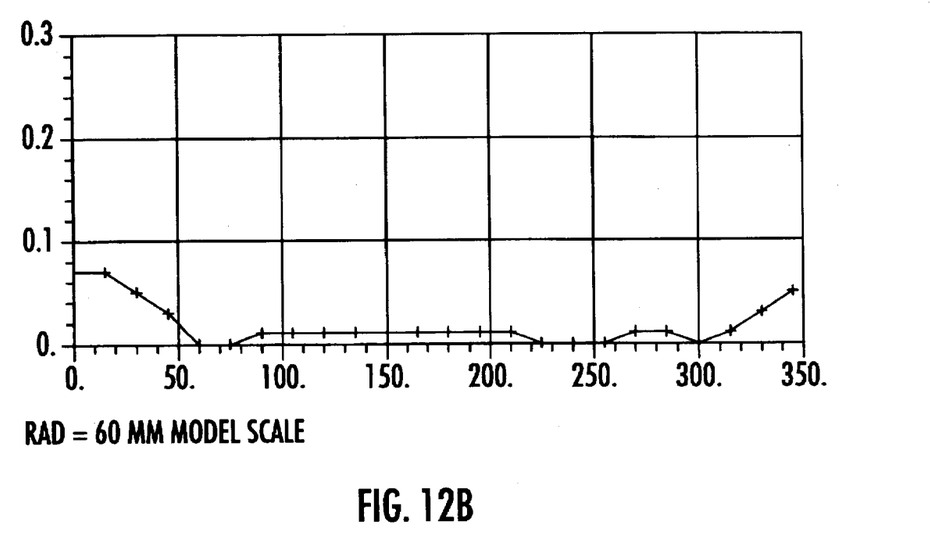
FIG. 12b shows test results for the Taylor Wake for angular positions at a radius of 60 mm relative to the scaled model.
Figure 12C:
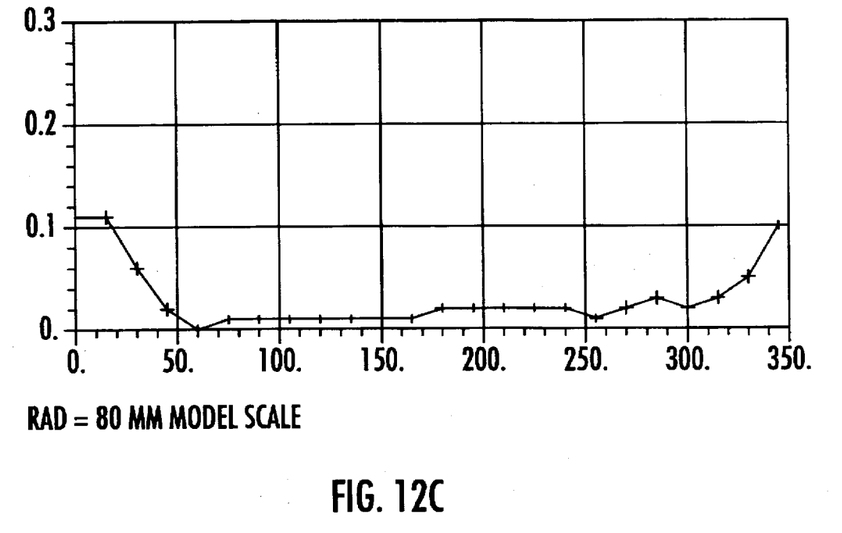
FIG. 12c shows test results for the Taylor Wake for angular positions at a radius of 80 mm relative to the scaled model.
Figure 12D:
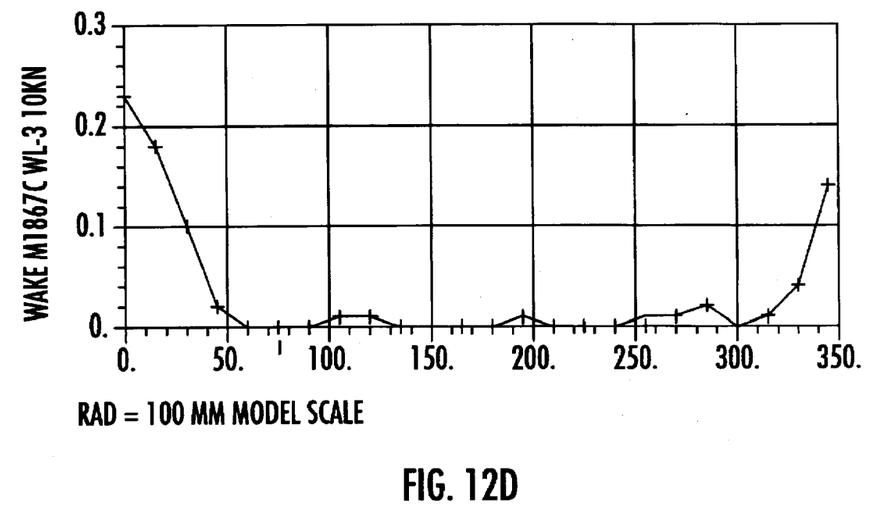
FIG. 12d shows test results for the Taylor Wake for angular positions at a radius of 100 mm relative to the scaled model.

Referring to FIGS. 9, 10 and 11, one embodiment of the invention is shown from the starboard side, the aft, and the top, respectively. Here, a propeller is positioned below the oblique surface (10) near a corner of the stern of the ship. A second propeller (30) is also positioned below the oblique surface (10) near the opposite corner of the stern of the ship.

Tests were performed to determine the magnitude of the hull wake at the stern corners. The test parameters included:

| | |
|---|---|
| Model: | M-1867C |
| Scale: | 1:26.50 |
| Draught: | $T_{AP}$ = 5.44 m, $T_{FP}$ = 4.18 m |
| Trim: | 1 degree aft |
| Speed: | 10.0 knots |
| Center of propeller disc: | 6.25 m from transom; 15 m from centerplane; 1.46 m from base plane |

Figure 13:
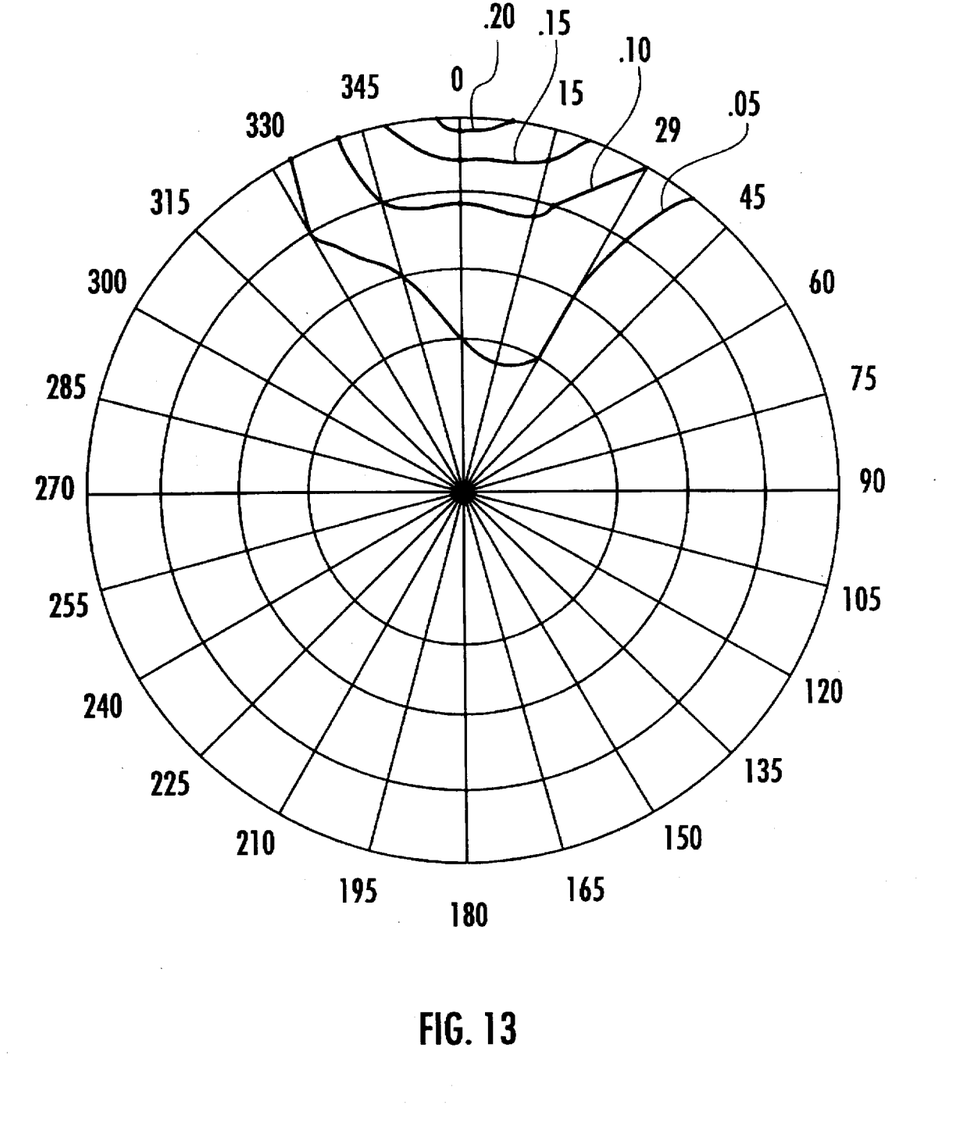
FIG. 13 depicts a curve of constant wake fractions for the propeller disc.

The pitot-tube, of course, measures the velocity of the water particles through the propeller disc. The pitot-tube wake survey was undertaken by moving the pitot-tube systematically over the propeller disc area. Referring the FIGS. 12a–12d, test results for the Taylor Wake are provided for angular positions at radii ranging from 40 mm to 100 mm, respectively relative to the scale model. The data from the graphs in FIGS. 12a–12d are incorporated into a curve of constant wake fractions for the propeller disc shown in FIG. 13. As shown in FIG. 13, there is no hull wake across most of the propeller disc. Only between 330° and 30° is there a slight hull wake and even here the wake fraction is less than 0.2. This means that a propeller which is attached to the hull of the ship at this location runs through water flowlines that are nearly undisturbed by the ship's hull.

Referring again to FIG. 9, another aspect of the invention is depicted. The central axis (21) of the propeller (20) is parallel to the base plane (11) of the ship. This serves two purposes: first, the entire thrust vector of the propeller is in the forward direction of the ship; and second, the axis (21) of the propeller (20) can be swivelled 360° to direct the thrust vector in any direction parallel to the base plane (11) of the ship. With the entire thrust component oriented in the direction of the ship's forward motion more efficiently utilizes the power necessary to propel the ship.

Referring again to FIG. 11, propellers (20) and (30) are shown, one in each of the stern corners below the oblique plane. This allows for improved maneuverability and control of the ship. Not only may the ship be steered by varying the thrust from the propellers (20) and (30), but the axes of the propellers (20) and (30) may be swivelled from side to side so as to provide thrust vectors transverse to the forward motion of the ship. The propellers (20) and (30) may be efficiently swivelled because they are operated in zones of fluid flow where there is almost no hull wake. Also, a third propeller (40) is shown, which extends below the keel line near the bow. This propeller also has the ability to swivel from side to side for added maneuverability.

Figure 14:
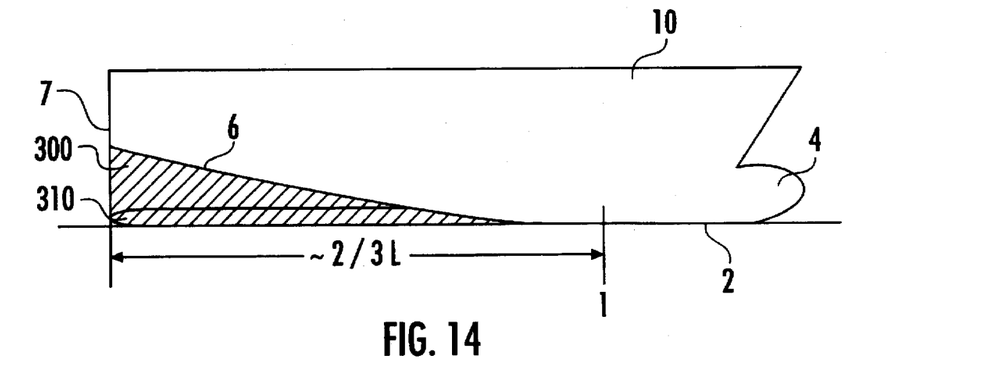
FIG. 14 is a starboard view of an embodiment of the invention having a skeg.

Another embodiment of the invention is shown in FIG. 14. It represents a schematic side view of a hull comprising a skeg extending in the longitudinal direction from about L/3 measured from forward perpendicular FP of the ship with regard to the length L of the ship to the transom stern 7. The skeg 300 corresponds to the shaded area in FIGS. 14–16. The general shape of the hull form of the sinusoidal waterline-type hull ship comprises a bulbous bow 4 extending in forward direction beyond forward perpendicular FP of the ship, a sloped or oblique surface 6 starting from about L/3 and running to the transom stern 7 of the ship and a base plane 2 which forms the borderline plane for the maximum vertical extension of the center skeg 300, so that the center skeg 300 has a maximum vertical extension or height which in each cross section of the ship corresponds to the center plane 2.

Figure 15:
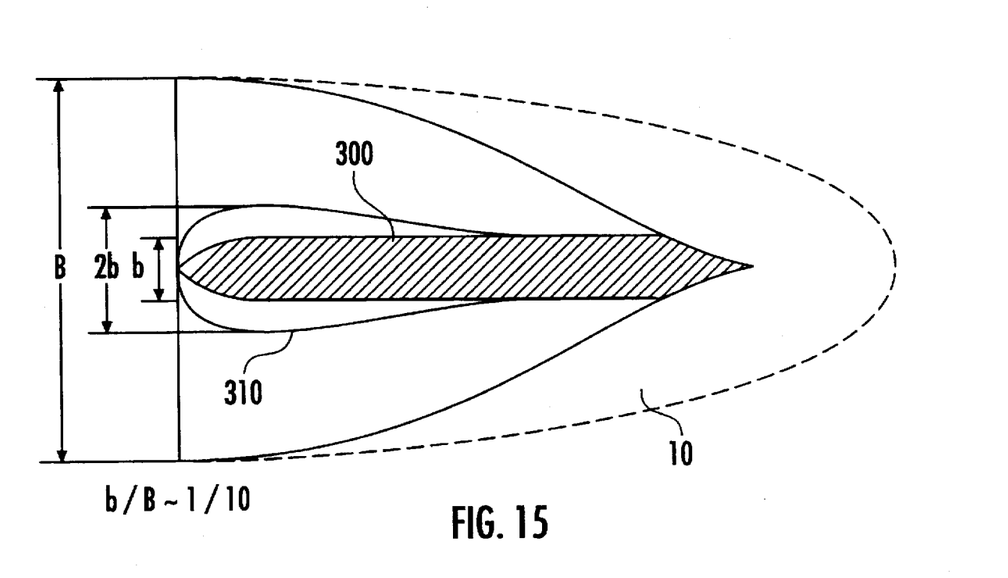
FIG. 15 is a top view of an embodiment of the invention having a skeg.

FIG. 15 shows a bottom plan view according to FIG. 14 showing the longitudinal and transversal extension and shape in a principal representation of the center skeg. In longitudinal direction of the ship, the center skeg starts with a zero vertical extension, that means at a level coinciding with the base plane 2 and gradually increasing in height, that means in vertical extension towards the transom stern 7 so that the lowermost portion of the skeg coincides with the base plane 2 at each and every cross section of the ship. For reducing turbulence, the thickness of the skeg gradually decreases to zero value at the transom stern 7 of the ship.

In order to further increase the rolling stability of the ship and to increase the deadweight of the ship without altering the overall dimensions of the ship, the skeg comprises skeg bulges 310 which are arranged in the lower portions of the skeg, that means in the area of the skeg adjacent to the base plane 2 without going beyond the base plane 2. The skeg bulges 310 tangentially run out of the substantially parallel side walls of the skeg 300 at a location of about L/3 of the ship, and gradually increase towards a maximum horizontal extension at the aft portion of the ship, from which the horizontal extension oft he skeg bulges 310 gradually decrease to zero extension and therefore coinciding with the aftmost portion of the skeg 300. With a skeg of thickness (b), it is advantageous to have a maximum horizontal extension from the starboard extension to the port extension of said skeg bulges which correspond to 2b, that means double the width or thickness of the skeg. If the beam of the ship is designated with B, the thickness of the skeg related to the beam of the ship, that means b/B is approximately 1 over 10.

Figure 16:
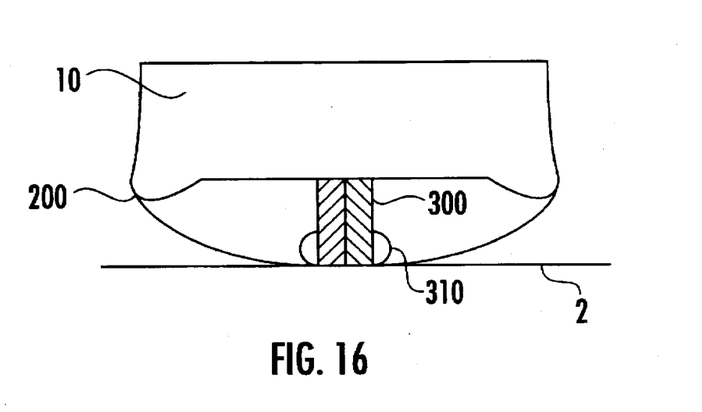
FIG. 16 is an aft view of an embodiment of the invention having a skeg.

FIG. 16 represents a schematic view from the transom stern according to FIG. 14 for a sinusoidal waterline-type hull ship with a skeg including skeg bulges as well as horizontally and vertically extending hull bulges. This view according to FIG. 16 represents a combination of hull bulges 200 with the inventive center skeg 300 including skeg bulges 310 on either side of the skeg 300. The skeg 300 as well as the skeg bulges 310 result in an increased deadweight of about 20 to 30 percent of the ship without altering the overall dimensions of the ship. As it can be seen from FIG. 16, the skeg bulges 310 tangentially run into the substantially parallel sidewalls of the center skeg 300 at the transition periods from the skeg bulges into the center skeg wall. Both the center skeg 300 and the hull bulges 200 alone and in combination result in a significantly improved rolling behavior of the ship.

While the particular embodiments for the device of the present invention as herein disclosed in detail are fully capable of obtaining the objects and advantages herein stated, it is to be understood that they are merely illustrative of the presently preferred embodiments of the invention and that no limitations are intended by the details of construction or design herein shown other than as described in the appended claims.

I claim:

1. A ship of a displacement type with a pointed bow and a transom stern, a longitudinal length of L, and defining a base plane and a design waterline plane, the ship comprising:

approximately sinusoidal waterlines;

a surface extending from the transom stern at the design waterline plane to the base plane at about L/2 and defining an angle between:

the base plane and an oblique plane, said oblique plane being defined by:

a line at the intersection of the transom stern and the design waterline plane and a point located on said surface at about 0.2 L from the transom stern, and a first propeller which is attached to the ship, wherein the maximum local hull wake through said first propeller is less than 0.50, and wherein said first propeller swivels so that an axis of said first propeller turns in any direction parallel to the base plane of the ship.

2. A ship as in claim 1, wherein said first propeller is attached to the ship so that the maximum local hull wake through said first propeller is less than 0.20.

3. A ship as in claim 1, wherein said first propeller is attached to the ship so that the maximum local hull wake through said first propeller is less than 0.10.

4. A ship as in claim 1, wherein said first propeller is attached to said surface near a corner of the transom stern.

5. A ship as in claim 1, further comprising a keel line which extends from the bow of the ship to said surface at about L/2 and wherein a second propeller is attached to the ship at said keel line.

6. A ship as in claim 1, wherein an axis of said first propeller is substantially parallel to the base plane of the ship.

7. A ship as in claim 1, wherein said first propeller is powered electrically.

8. A ship as in claim 1, further comprising a second propeller.

9. A ship as in claim 8, wherein said second propeller is attached to said surface of the ship near a corner of the transom stern.

10. A ship as in claim 8, wherein said second propeller is oriented such that an axis of said second propeller is substantially parallel to the base plane of the ship.

11. A ship as in claim 8, wherein said second propeller is powered electrically.

12. A ship as in claim 1, further comprising a plurality of propellers.

13. A ship as in claim 12, wherein said plurality of propellers are oriented so that central axes of said plurality of propellers are parallel to the base plane of the ship.

14. A ship as in claim 12, wherein said plurality of propellers swivel so that the axes of said plurality of propellers turn in any direction parallel to the base plane of the ship.

15. A ship of a displacement type with a transom stern, a longitudinal length of L, and defining a base plane and a design waterline plane, the ship comprising:

approximately sinusoidal waterlines;

a surface extending from the transom stern at the design waterline plane to the base plane at about L/2 and defining an angle between:

the base plane and an oblique plane, said oblique plane being defined by:

a line at the intersection of the transom stern and the design waterline plane and a point located on said surface at about 0.2 L from the transom stern;

a first vertically rotatable propeller attached in the rear half of said surface of the ship near a first corner of the transom stern at a position wherein the local hull wake through said first propeller is less than about 0.5;

a second vertically rotatable propeller attached in the rear half of said surface of the ship near a second corner of the transom stern at a position wherein the local hull wake through said second propeller is less than about 0.5;

a third vertically rotatable propeller attached along a bow keel line.

16. A ship as in claim 15, further comprising:

a first fin extending from the surface and next to the first propeller, the first fin being located outside of the first propeller, and a second fin extending from the surface and next to the second propeller, the second fin being located outside the second propeller.

* * * * *

UNITED STATES PATENT AND TRADEMARK OFFICE
CERTIFICATE OF CORRECTION

| | | |
|---|---|---|
| PATENT NO. | : 5,711,239 | Page 1 of 1 |
| APPLICATION NO. | : 08/579332 | |
| DATED | : January 27, 1998 | |
| INVENTOR(S) | : Roar Rolland Ramde | |

It is certified that error appears in the above-identified patent and that said Letters Patent is hereby corrected as shown below:

Title page, item [73] Assignee should be deleted.

Signed and Sealed this
Fifteenth Day of February, 2011

David J. Kappos
*Director of the United States Patent and Trademark Office*